United States Patent
Agarwal et al.

(10) Patent No.: US 12,273,718 B2
(45) Date of Patent: Apr. 8, 2025

(54) WIRELESS CHANNEL POWER PROFILE FALSE BASE STATION DETECTION

(71) Applicant: QUALCOMM Incorporated, San Diego, CA (US)

(72) Inventors: Ravi Agarwal, San Diego, CA (US); Gavin Bernard Horn, La Jolla, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/527,167

(22) Filed: Dec. 1, 2023

(65) Prior Publication Data
US 2024/0098498 A1 Mar. 21, 2024

Related U.S. Application Data

(62) Division of application No. 17/086,267, filed on Oct. 30, 2020, now Pat. No. 11,889,313.
(Continued)

(51) Int. Cl.
*H04W 12/02* (2009.01)
*H04W 4/02* (2018.01)
(Continued)

(52) U.S. Cl.
CPC ......... *H04W 12/122* (2021.01); *H04W 12/63* (2021.01); *H04B 7/0626* (2013.01);
(Continued)

(58) Field of Classification Search
CPC .... H04W 12/122; H04W 76/11; H04W 48/12
(Continued)

(56) References Cited

U.S. PATENT DOCUMENTS 7,430,191 B2 * 9/2008 Subrahmanya ..... H04L 27/2332
370/335
8,577,299 B2 11/2013 Agrawal et al.
(Continued)

FOREIGN PATENT DOCUMENTS

CN 100536379 C 9/2009
CN 103997757 A * 8/2014
(Continued)

OTHER PUBLICATIONS

Huawei: "DL and UL Reference Signals for NR Positioning", 3GPP Draft; 3GPP TSG RAN WG1 Meeting #96bis, R1-1904004, 3rd Generation Partnership Project (3GPP), Mobile Competence Centre; 650, Route Des Lucioles; F-06921 Sophia-Antipolis Cedex; France, vol. RAN WG1, No. Xi'an, China; Apr. 8, 2019-Apr. 12, 2019, Apr. 2, 2019 (Apr. 2, 2019), XP051707080, 13 Pages, The whole document, Section 1, paragraph [02.3]-paragraph [02.4], p. 3.
(Continued)

*Primary Examiner* — Haresh N Patel
(74) *Attorney, Agent, or Firm* — Procopio, Cory, Hargreaves & Savitch LLP/Qualcomm

(57) ABSTRACT

In a wireless access network, a false base station (FBS) may imitate a legitimate base station by repeating the transmissions of the legitimate base station at a higher power level such that one or more user equipment (UEs) synchronize with the FBS instead of the legitimate base station. The present disclosure provides a UE that detects an FBS. The UE may estimate a time of arrival of different multipath components of a downlink signal corresponding to a physical cell identity. The UE may determine an existence of FBS based on a difference between the times of arrival of two of the different multipath components exceeding a threshold amount of time. The UE may perform a mitigation operation in response to determining the existence of the FBS.

20 Claims, 12 Drawing Sheets

Related U.S. Application Data

(60) Provisional application No. 62/935,595, filed on Nov. 14, 2019.

(51) Int. Cl.
| | | |
|---|---|---|
| *H04W 12/122* | (2021.01) | |
| *H04W 12/63* | (2021.01) | |
| *H04B 7/06* | (2006.01) | |
| *H04L 5/00* | (2006.01) | |
| *H04W 12/108* | (2021.01) | |
| *H04W 12/61* | (2021.01) | |
| *H04W 48/12* | (2009.01) | |
| *H04W 56/00* | (2009.01) | |
| *H04W 76/11* | (2018.01) | |

(52) U.S. Cl.
CPC ......... *H04L 5/0051* (2013.01); *H04W 12/108* (2021.01); *H04W 12/61* (2021.01); *H04W 48/12* (2013.01); *H04W 56/001* (2013.01); *H04W 76/11* (2018.02)

(58) Field of Classification Search
USPC .......................................................... 726/26
See application file for complete search history.

(56) References Cited

U.S. PATENT DOCUMENTS

| | | | |
|---|---|---|---|
| 10,594,652 B2 | 3/2020 | Bhushan et al. | |
| 2009/0041093 A1* | 2/2009 | Dong | H04B 1/7115 375/E1.032 |
| 2010/0157833 A1 | 6/2010 | Vrcelj et al. | |
| 2013/0235844 A1* | 9/2013 | Ge | H04W 36/00 370/331 |
| 2014/0128079 A1 | 5/2014 | Soliman et al. | |
| 2015/0110048 A1* | 4/2015 | Damnjanovic | H04W 72/51 370/329 |
| 2016/0021603 A1* | 1/2016 | Mueck | H04W 48/16 455/418 |
| 2016/0128045 A1* | 5/2016 | Azarian Yazdi | H04L 5/0053 370/330 |
| 2016/0174107 A1* | 6/2016 | Kanugovi | H04W 28/12 370/236 |
| 2016/0192374 A1* | 6/2016 | Negus | H04W 28/18 370/280 |
| 2016/0295557 A1* | 10/2016 | Azarian Yazdi | H04L 1/1671 |
| 2016/0309332 A1 | 10/2016 | Norrman et al. | |
| 2018/0054832 A1* | 2/2018 | Luo | H04L 45/16 |
| 2018/0063748 A1* | 3/2018 | Ling | H04L 43/0894 |
| 2018/0220398 A1* | 8/2018 | John Wilson | H04B 7/0695 |
| 2018/0220403 A1* | 8/2018 | John Wilson | H04W 72/23 |
| 2018/0227102 A1* | 8/2018 | John Wilson | H04L 5/001 |
| 2018/0262993 A1* | 9/2018 | Akkarakaran | H04W 52/325 |
| 2018/0351975 A1 | 12/2018 | Briggs et al. | |
| 2019/0141537 A1 | 5/2019 | Jiang et al. | |
| 2019/0199571 A1* | 6/2019 | John Wilson | H04W 52/146 |
| 2019/0246378 A1* | 8/2019 | Islam | H04L 1/1819 |
| 2019/0320443 A1* | 10/2019 | Wang | H04W 4/70 |
| 2019/0334603 A1* | 10/2019 | Venugopal | H04L 5/0057 |
| 2020/0053745 A1* | 2/2020 | Luo | H04W 72/20 |
| 2020/0112974 A1* | 4/2020 | Sun | H04W 72/23 |
| 2020/0145821 A1* | 5/2020 | Lee | H04W 12/037 |
| 2020/0169995 A1* | 5/2020 | Nam | H04W 72/044 |
| 2021/0143875 A1* | 5/2021 | Svendsen | H04B 7/0456 |
| 2021/0153024 A1 | 5/2021 | Agarwal | |

FOREIGN PATENT DOCUMENTS

| | | | | |
|---|---|---|---|---|
| CN | 105992239 A | 10/2016 | | |
| CN | 106231597 A | 12/2016 | | |
| CN | 106332087 A | 1/2017 | | |
| CN | 109699026 A | 4/2019 | | |
| CN | 105532035 B | * 7/2019 | ............ | H04W 24/00 |
| CN | 105766034 B | 9/2019 | | |
| CN | 106063322 B | 9/2019 | | |
| CN | 105656832 B | 10/2019 | | |
| CN | 110574479 A | 12/2019 | | |
| CN | 113196866 A | 7/2021 | | |
| EP | 3032756 A1 | 6/2016 | | |
| IN | 201747020871 A | 6/2017 | | |
| WO | 2005122517 A1 | 12/2005 | | |
| WO | 2010075539 A1 | 7/2010 | | |
| WO | 2016060895 A2 | 4/2016 | | |
| WO | 2016096836 A1 | 6/2016 | | |
| WO | 2017206455 A1 | 12/2017 | | |
| WO | WO-2018018795 A1 * | 2/2018 | | |
| WO | 2018200128 A1 | 11/2018 | | |

OTHER PUBLICATIONS

International Preliminary Report on Patentability—PCT/US2020/058604, the International Bureau of WIPO—Geneva, Switzerland, May 27, 2022.

International Search Report and Written Opinion—PCT/US2020/058604—ISA/EPO—Feb. 1, 2021.

* cited by examiner

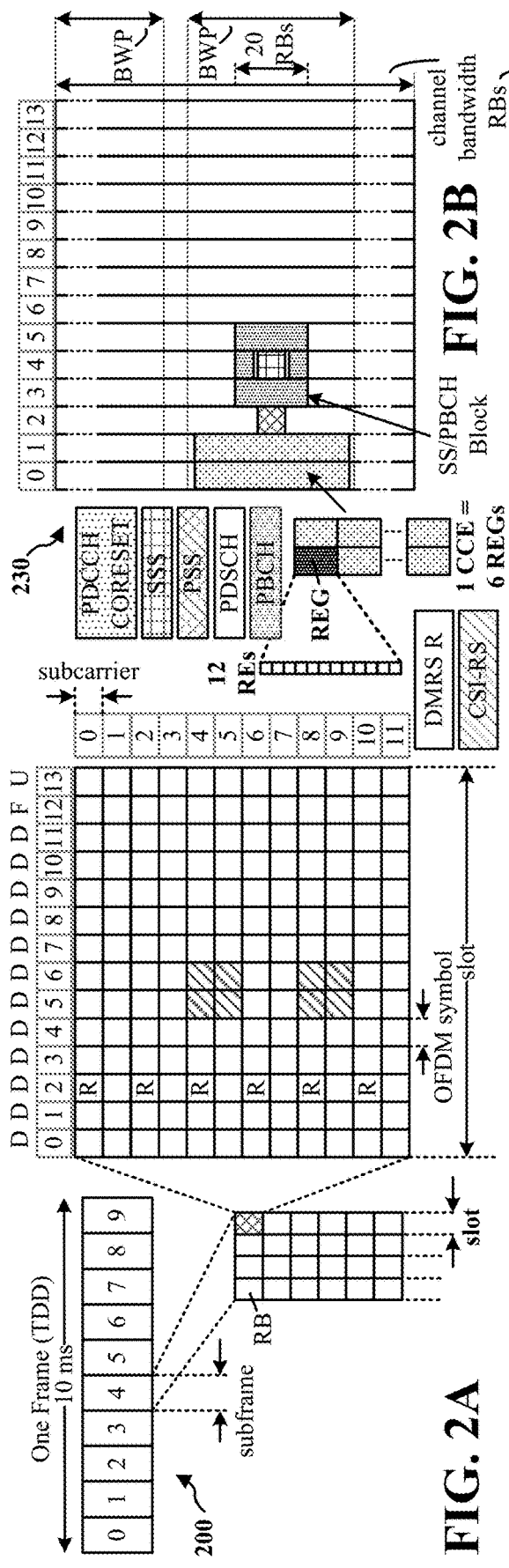
FIG. 2A
FIG. 2B
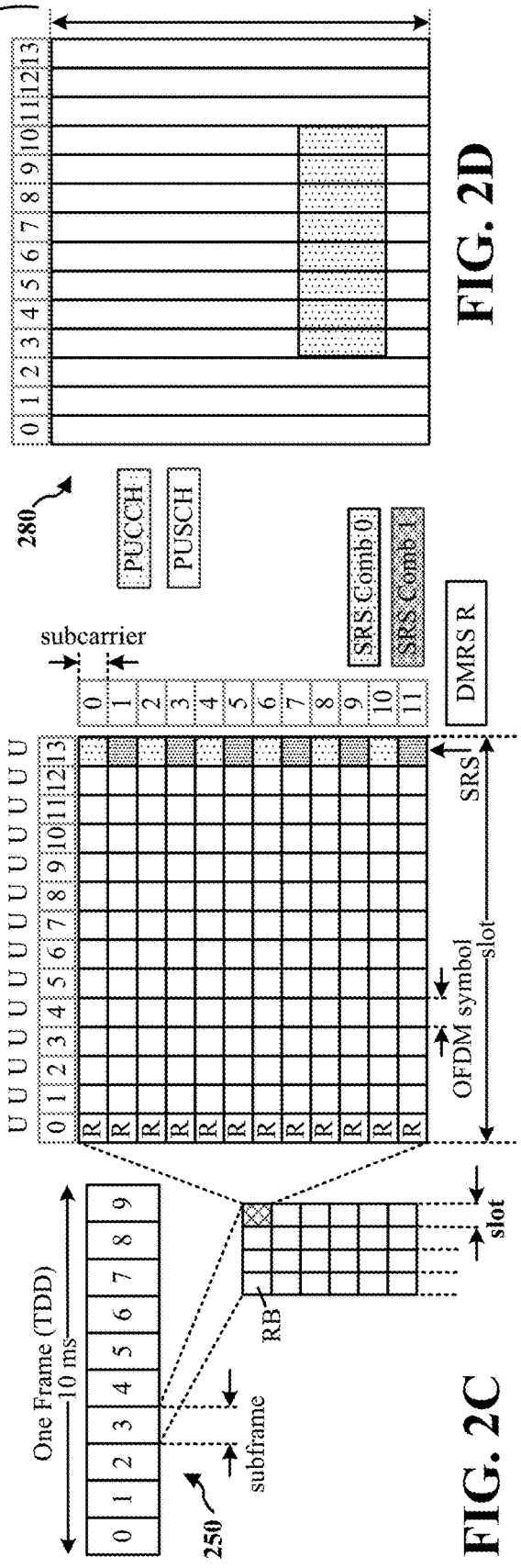
FIG. 2C
FIG. 2D

WIRELESS CHANNEL POWER PROFILE FALSE BASE STATION DETECTION

CROSS REFERENCE TO RELATED APPLICATION(S)

This application is a divisional of U.S. application Ser. No. 17/086,267, entitled "Wireless Channel Power Profile False Base Station Detection", now U.S. Pat. No. 11,889,313, and filed on Oct. 30, 2020, which claims the benefit of U.S. Provisional Application Ser. No. 62/935,595, entitled "Wireless Channel Power Profile False Base Station Detection" and filed on Nov. 14, 2019, the entire contents of each of which are expressly incorporated by reference herein in their entirety.

INTRODUCTION

Technical Field

The present disclosure relates generally to communication systems, and more particularly, to detection of false base stations in a wireless network.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a wireless access network, a false base station (FBS) may imitate a legitimate base station by repeating the transmissions of the legitimate base station at a higher power level such that one or more user equipment (UEs) synchronize with the FBS instead of the legitimate base station. The FBS may then act as a man-in-the-middle and launch various attacks such as a denial of service attack. In particular, the FBS may decode physical layer transmissions to determine whether to drop the transmission to the UE. Accordingly, the FBS may deny services to the UE.

The present disclosure provides aspects for a UE to detect an FBS. As presented herein, the UE may estimate a time of arrival of different multipath components of a downlink signal corresponding to a physical cell identity. The UE may determine an existence of the FBS based on a difference between the times of arrival of two of the different multipath components exceeding a threshold amount of time. As the FBS decodes the physical layer downlink signal in order to determine whether to drop the signal to the UE, the UE may identify the presence of an FBS if the delay of the repeated signal is greater than an expected amount due to propagation and/or a legitimate repeater. Accordingly, the UE may determine that the later arriving multipath components indicate presence of an FBS. The UE may perform a mitigation operation in response to determining the existence of the FBS.

In an aspect of the disclosure, a method, a computer-readable medium, and an apparatus for a UE are provided. The apparatus may include a memory and at least one processor coupled to the memory and configured to execute instructions stored therein. The at least one processor may be configured to estimate a time of arrival of different multipath components of a downlink signal corresponding to a physical cell identity (PCI). The at least one processor may be configured to determine an existence of an FBS based on a difference between the times of arrival of two of the different multipath components exceeding a threshold amount of time. The at least one processor may be configured to perform a mitigation operation in response to determining the existence of the FBS.

In another aspect of the disclosure, a method, a computer-readable medium, and an apparatus for a base station are provided. The apparatus may include a memory and at least one processor coupled to the memory and configured to execute instructions stored therein. The at least one processor may be configured to determine, by a base station, a threshold amount of time that signifies a maximum allowable difference between arrival of different multipath components of a downlink signal corresponding to PCI of the base station The at least one processor may be configured to transmit the threshold amount of time to a UE for detection of an FBS by the UE. In an aspect, the at least one processor may be configured to receive an indication that a device connected to the base station has detected an FBS based on a difference between two of the different multipath components exceeding the threshold amount of time. The at least one processor may be configured to perform a mitigation operation in response to the indication.

To the accomplishment of the foregoing and related ends, the one or more aspects comprise the features hereinafter fully described and particularly pointed out in the claims. The following description and the annexed drawings set forth in detail certain illustrative features of the one or more

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
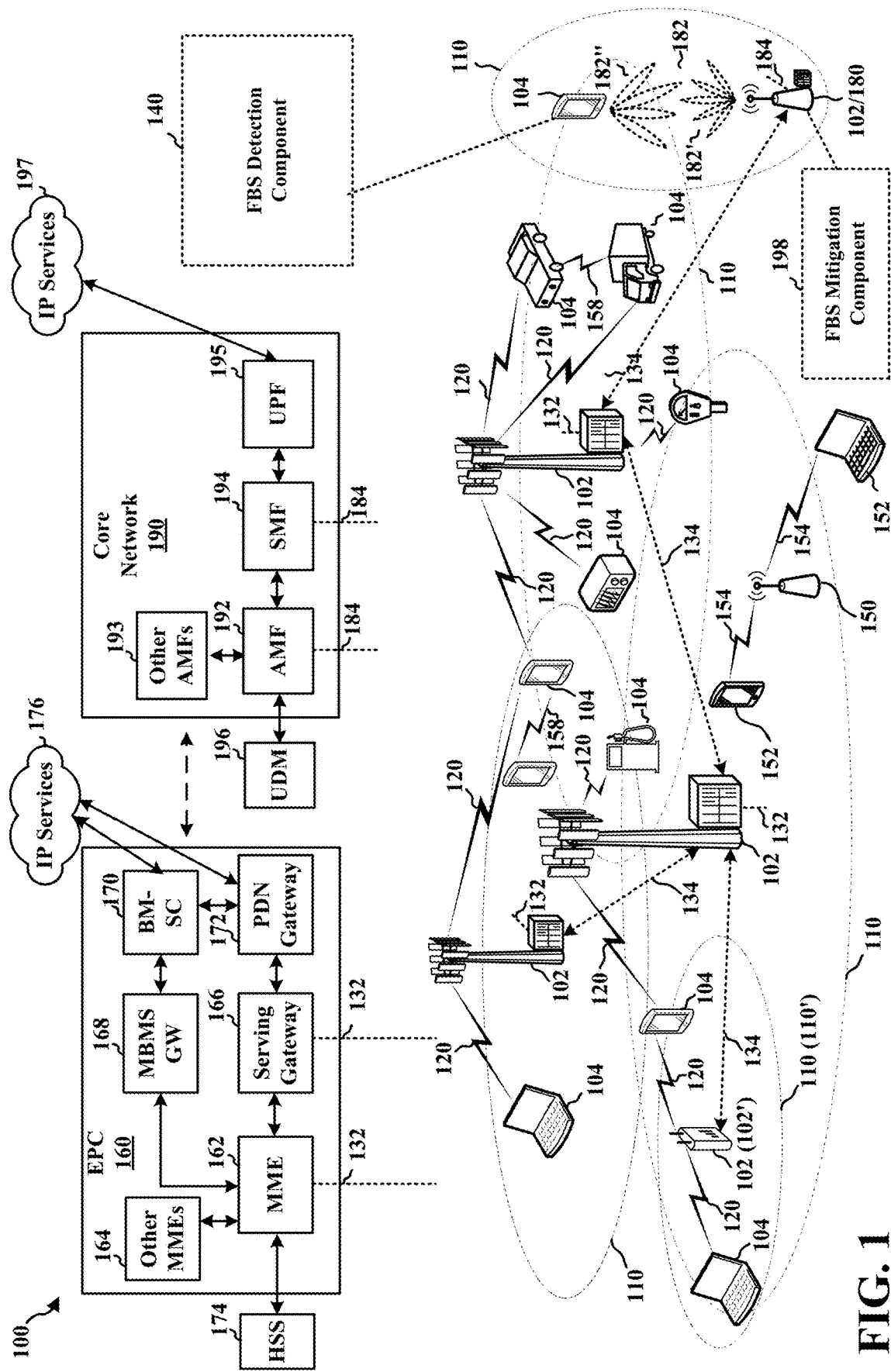
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an FBS detection component 140 configured to estimate a time of arrival of different multipath components of a downlink signal corresponding to a PCI. The FBS detection component 140 may be configured to determine an existence of an FBS based on a difference between the times of arrival of two of the different multipath components exceeding a threshold amount of time. The FBS detection component 140 may be configured to perform a mitigation operation in response to determining the existence of the FBS.

In certain aspects, the base station 180 may include an FBS mitigation component 198 configured to indicate, by a base station, a threshold amount of time that signifies a maximum allowable difference between arrival of different multipath components of a downlink signal corresponding to a physical cell identity (PCI) of the base station. The FBS mitigation component 198 may be configured to receive an indication that a device connected to the base station has detected an FBS based on a difference between two of the different multipath components exceeding the threshold amount of time. The FBS mitigation component 198 may be configured to perform a mitigation operation in response to the indication.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARM) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
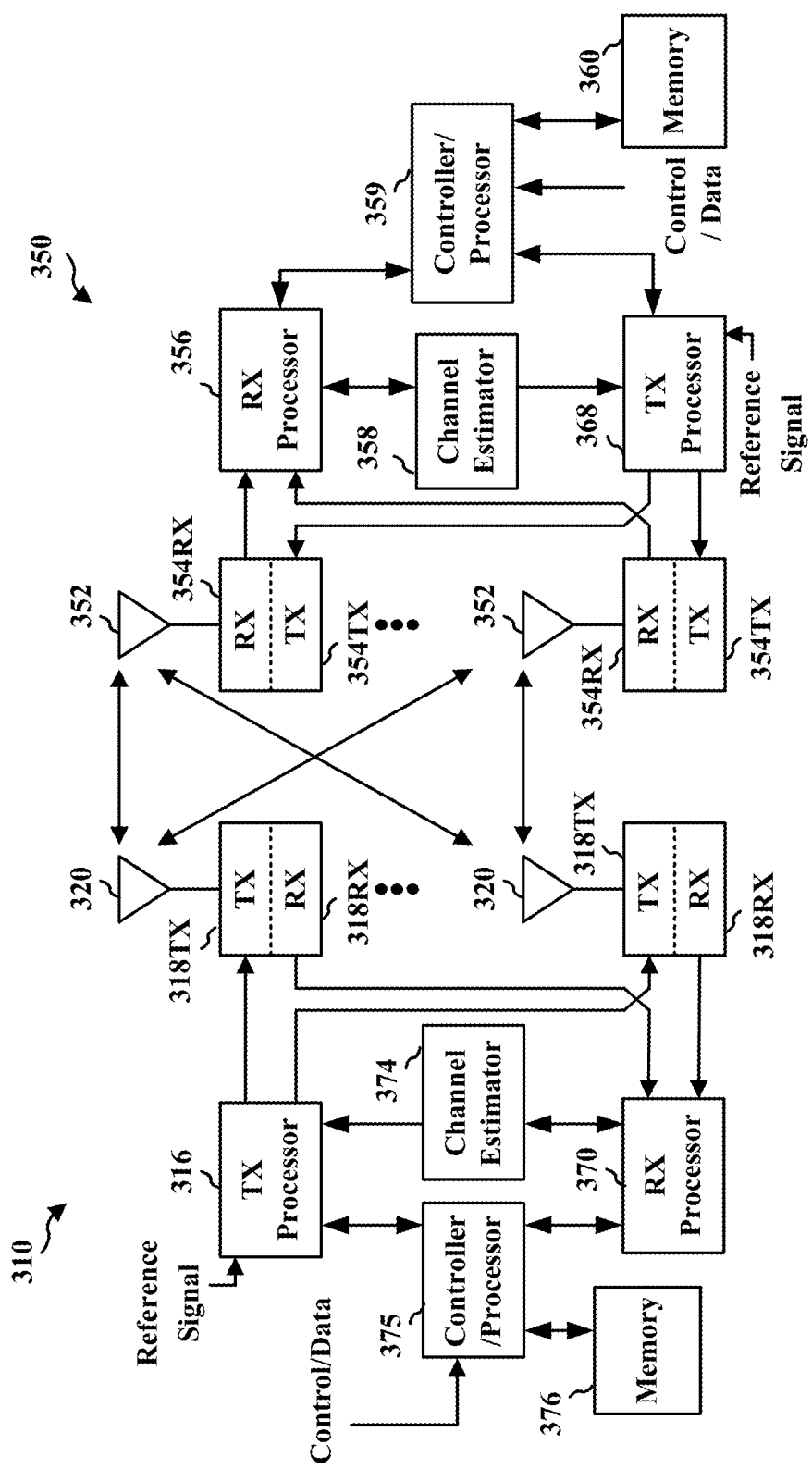
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the FBS detection component 140 of FIG. 1.

At least one of the TX processor 316, the RX processor 370, and the controller/processor 375 may be configured to perform aspects in connection with the FBS mitigation component 198 of FIG. 1.

Figure 4:
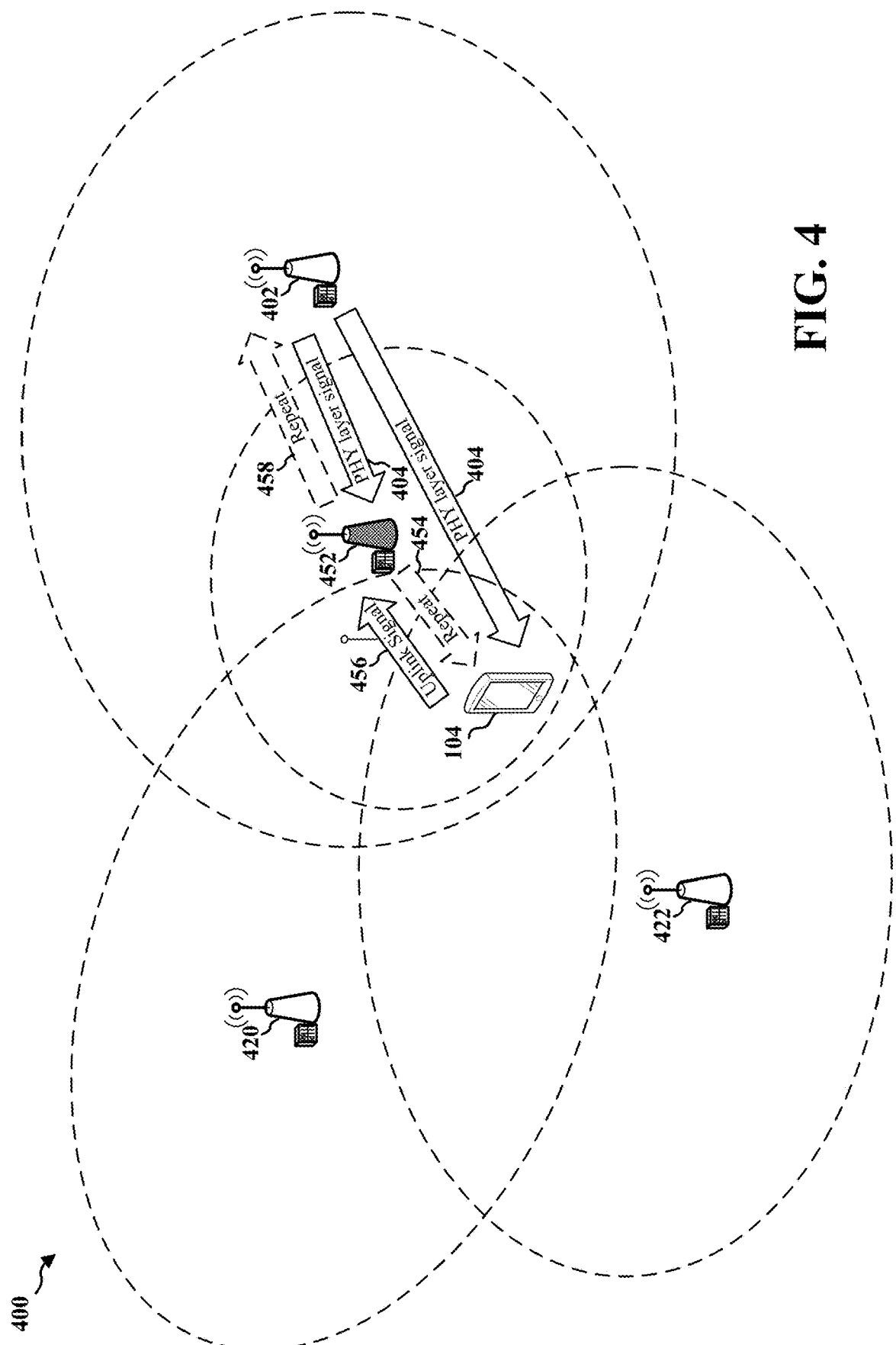
FIG. 4 is a schematic diagram illustrating an example access network in which an FBS is deployed.

FIG. 4 is a diagram of an example access network 400 including a false base station (FBS) 452 in communication with a UE 104. The access network 400 may include a legitimate cell 402 that the FBS 452 imitates. The legitimate cell may be a cell that is provided by the access network 400 and which is the source of a downlink signal to the UE 104. The legitimate cell, or legitimate base station, may refer to a cell or base station belonging to a network (e.g., a communication network such as a cellular network) that the UE 104 is trying to access for service. In contrast to the legitimate cell 402, the FBS is not associated with the access network 400 and selectively repeats a downlink signal from the legitimate cell 402 rather than being the source of the downlink signal. The access network 400 may also include additional cells 420 and 422 that represent other legitimate cells. The UE 104 may be within a coverage area of the FBS 452, the legitimate cell 402 without being in the coverages area of other cells in some examples. In other examples, the UE 104 may be within a coverage area of the FBS 452 and one or more of the additional cells 420 and 422. Security features for the air interface may be implemented, e.g., at the Packet Data Convergence Protocol (PDCP) layer through ciphering and integrity protection of data and signaling packets. For example, such security features may be applied for wireless communication based on technologies such as LTE and/or NR, etc. Signaling that originates below the PDCP layer may not be secured by the ciphering and integrity protection. In particular, physical (PHY) layer channels and signals such as the synchronization signal block (SSB), PDCCH, PUCCH, random access channel (RACH), CSI-RS, and SRS may not be protected through a security feature such as ciphering or integrity protection. Thus, an adversary (e.g., a non-authorized device that attempts to present itself as a network device) can construct the PHY layer channels and signals of an actual base station and launch various attacks against the wireless communication system. Such attacks can include selective jamming against a particular PHY channel or False Base Station (FBS) attacks.

An FBS 452 poses a security threat to wireless communication systems. The FBS 452 may be a non-authorized device that transmits synchronization signals to get the UE 104 to synchronize to the FBS 452. For example, the FBS 452 may transmit the synchronization signals (e.g., SSB) with a relatively high power so that the UE 104 will be more likely to select the FBS 452 than a legitimate cell 402. Once the UE 104 is camped on or connected to the FBS 452, the FBS 452 may be able to launch different types of attacks against the UE.

For instance, a man-in-the-middle (MITM) FBS 452 may logically sit in the middle between the UE 104 and the legitimate cell 402 in the form of a malicious repeater. The FBS 452 may act as a legitimate cell towards the UE and as a UE towards the legitimate cell. For instance, in the downlink, the FBS 452 may receive a PHY layer signal 404 from the legitimate cell 402 and generate a repeated PHY layer signal 454. However, the FBS 452 may modify the repeated PHY layer signal 454 or inject unsecure transmissions, as well as, selectively drop some (secure or unsecure) transmissions on either link direction. The UE 104 may receive and decode the repeated PHY layer signal 454. Although the UE 104 may also receive the PHY layer signal 404 from the legitimate cell 402 the UE 104 may not decode the PHY layer signal 404, because the UE 104 is synchronized to the FBS 452. As another example, in the uplink, the UE 104 may transmit an uplink signal 456 to the FBS 452. The FBS 452 may repeat the uplink signal 456 as repeated uplink signal 458, may modify the uplink signal 456, or may drop the uplink signal 456.

The dropping of transmissions by an MITM FBS may be problematic because the FBS may drop transmissions (e.g., PHY layer signal 404 that are cryptographical secure (e.g., ciphered and integrity protected). If the MITM FBS drops only a selected subset of transmissions, then the FBS 452 may go undetected for a length of time. The MITM FBS may perform an attack on Physical Downlink Control Channel (PDCCH) by leading the UE to synchronize with the FBS and then dropping PDCCH transmissions from the actual base station. The UE may not detect the attack because a dropped PDCCH transmission would be treated by the UE 104 as if there were no transmission.

As an example of an attack, the MITM FBS 452 may selectively drop all PDCCH transmissions from the legitimate base station which carry short messages indicating a public warning system (PWS) notification. Then, any UE 104 connected to the legitimate cell 402 via the FBS 452 would not receive emergency warning messages and thus be the victim of a denial of service attack. As the UE 104 is unaware of incoming PWS notifications on PDCCH, the FBS 452 could go undetected for a substantial length of time.

Several characteristics of the FBS 452 may be inferred based on an assumption that the FBS 452 tries to remain undetected. First, a MITM FBS 452 may typically be configured to use the same physical cell identity (PCI) as the legitimate cell 402. The access stratum (AS) security keys used for PDCP security are derived using, amongst other parameters, the PCI of the serving cell (i.e. the legitimate cell 402). Accordingly, in order to relay secure signaling messages unmodified and remain undetected, the FBS may use the same PCI as the legitimate cell. If a different PCI were used, the integrity protection at the UE 104 would fail and the UE 104 may detect the FBS 452.

In order to remain undetected, the MITM FBS 452 may avoid dropping all PDCCH transmissions. For example, if the FBS 452 were to drop each PDCCH transmission including those scheduled on the system information (SI) radio network temporary identifier (RNTI), the UE would not be able to decode the SI and may suspect malicious behavior or find another cell. Similarly, the FBS 452 may avoid dropping a PDCCH scheduling a signaling radio bearer (SRB) message since the dropped SRB message may lead to a radio resource control (RRC) or non-access stratum (NAS) procedure timeout. The UE 104 may reselect to a new cell in response to such timeouts, thereby avoiding the FBS.

In order to selectively drop PDCCH transmissions, the FBS 452 may decode the PHY layer signal 404 from the legitimate cell 402 and decide on a subsequent action (e.g., repeat as repeated PHY layer signal 454 or drop) depending on the nature of the PHY layer signal 404. An FBS with the ability to decode PHY layer or layer 1 transmissions (e.g. PDCCH) may be referred to as an L1 MITM FBS.

Decoding the PDCCH and deciding a subsequent action, introduces extra delay in the downlink transmission (e.g., repeated PHY layer signal 454) from the FBS 452 to the UE 104 compared to the downlink transmission (e.g., PHY layer signal 404) from the legitimate cell 402 to the UE 104. The amount of extra delay may be on the order of the PDCCH transmission duration. As one, non-limiting example, in 5G NR, the minimum and maximum allowed PDCCH durations are one and three time-domain OFDM symbols, respectively. The symbol length may vary based on the numerology or sub-carrier spacing, but are known to the UE based on the configuration.

Figure 5:
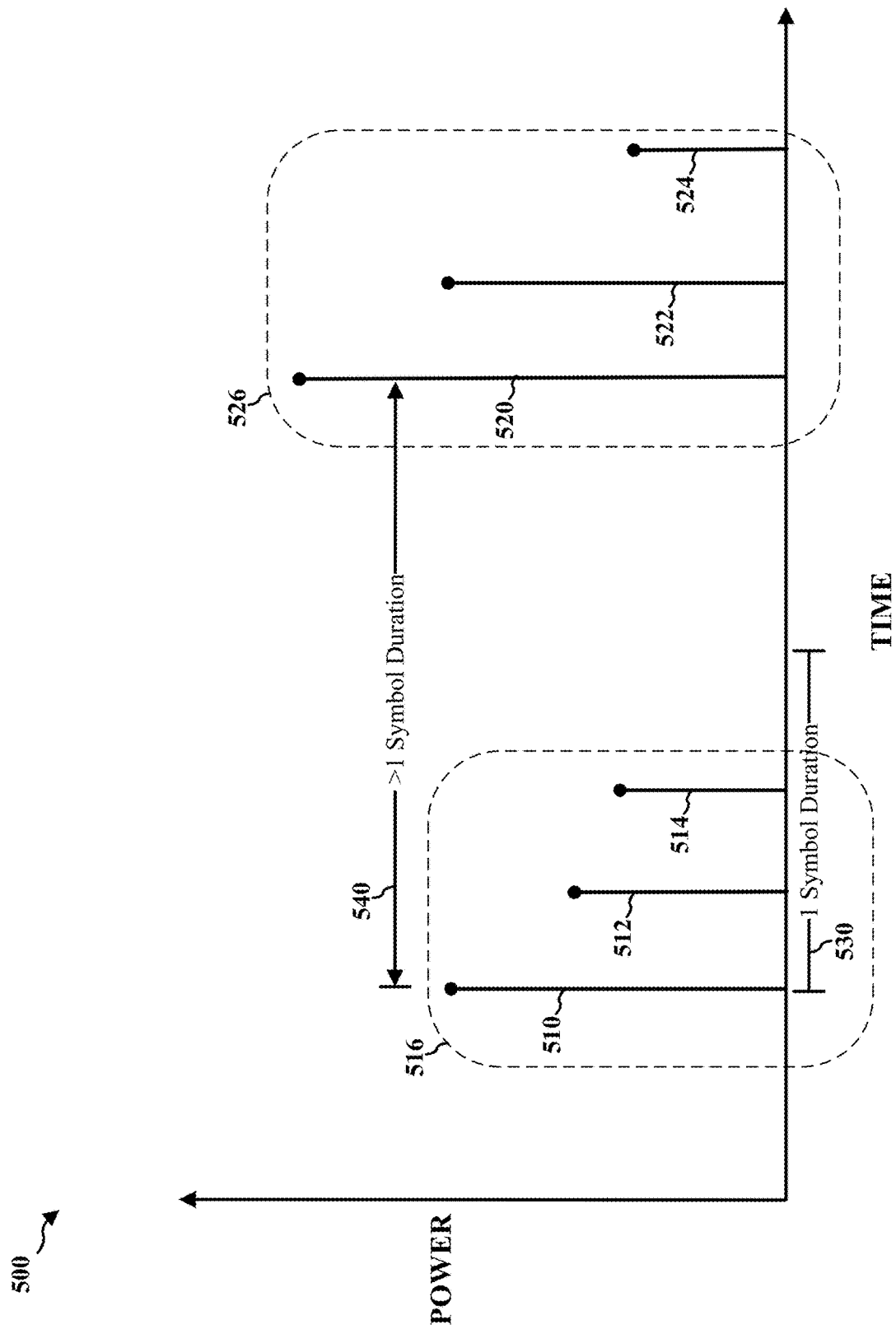
FIG. 5 is a diagram illustrating an example channel power profile.

FIG. 5 is a diagram of an example wireless channel power profile 500. The wireless channel power profile may include an estimation of a power level of a particular wireless signal at different times. In wireless communication, a radio signal propagates from the transmitter to the receiver at the speed of light. The radio signal, however, may reflect or refract causing the radio signal to take different paths. The radio signals that arrive at the receiver via different paths (e.g., different reflected paths) may be referred to as multipath components. The FBS detection component 140 may generate a wireless channel power profile 500 for a known signal such as SSB or CSI-RS. Accordingly, the wireless channel power profile 500 may indicate the time and power at which the various multipath components 510, 512, 514, 520, 522, 524 arrive.

The example wireless channel power profile 500 represents a probable profile when an FBS 452 is active. For example, the wireless channel power profile 500 may be for the PHY layer signal 404 illustrated in FIG. 4. The multipath components 510, 512, 514 may form a first cluster 516 that corresponds to the PHY layer signal 404. The multipath components 520, 522, 524 may form a second cluster 526 that corresponds to the repeated PHY layer signal 456. Although the FBS 452 repeats the PHY layer signal 404 such that the repeated PHY layer signal 456 is the same as the PHY layer signal 404, the repeating process including decoding the PHY layer signal 404 for selective dropping results in a delay of the repeated PHY layer signal 456.

Accordingly, the multipath components of the cluster 526 may arrive significantly after the multipath components of the cluster 516. In particular, the time difference 540 in arrival of the two components/clusters may be on the order of the PDCCH duration, that is, at least one OFDM time-domain symbol duration 530. For 30 KHz sub-carrier spacing (SCS), the OFDM time-domain symbol corresponds to a duration of 33.3 microseconds, which is much larger than the maximum expected wireless channel delay spread due to multipath propagation delays, e.g., in 5G NR. Although an example is provided for 5G NR to illustrate the concept, the aspects may be applied to other wireless technologies. Accordingly, such a power profile may be used by the UE to detect the presence of a MITM FBS such as the FBS 452. In particular the FBS detection component 140 may detect a time difference in arrival of multipath components for the same signal (e.g., a known signal or reference signal) that is greater than a threshold amount of time. The threshold amount of time may be the PDCCH duration or the duration of one OFDM time-domain symbol.

The UE 104 may also receive multicomponent paths from the legitimate repeater that may be deployed to extend the coverage are of the cell. A legitimate repeater, however, may repeat the RF signal from the legitimate cell 402 without down converting or decoding the RF signal. Accordingly, a difference in the arrival time for multipath components from a legitimate repeater may be within the threshold amount of time (e.g., less than a PDCCH duration).

Additionally, the received power level of the multipath components may provide additional evidence of an FBS MITM attack. For an MITM attack to be successful, the later arriving path (e.g., multipath components 520, 522, 524) from the FBS 452 is at a higher power than an earlier arriving path (e.g., multipath components 510, 512, 514) from the legitimate cell 402. The FBS 452 transmits with a higher power to improve the likelihood that the UE synchronizes to the FBS. If the received signals from the FBS 452 had a lower power than other signals, the UE 104 may synchronize with the other signals. Accordingly, in the channel power profile 500, the later arriving multipath components 520, 522, 524 are received with a higher power (e.g., received signal strength indicator (RSSI)) than the earlier arriving multipath components 510, 512, 514. The FBS detection component 140 may detect such power inversion to reinforce an FBS detection hypothesis based on the time difference in arrival.

Figure 6:
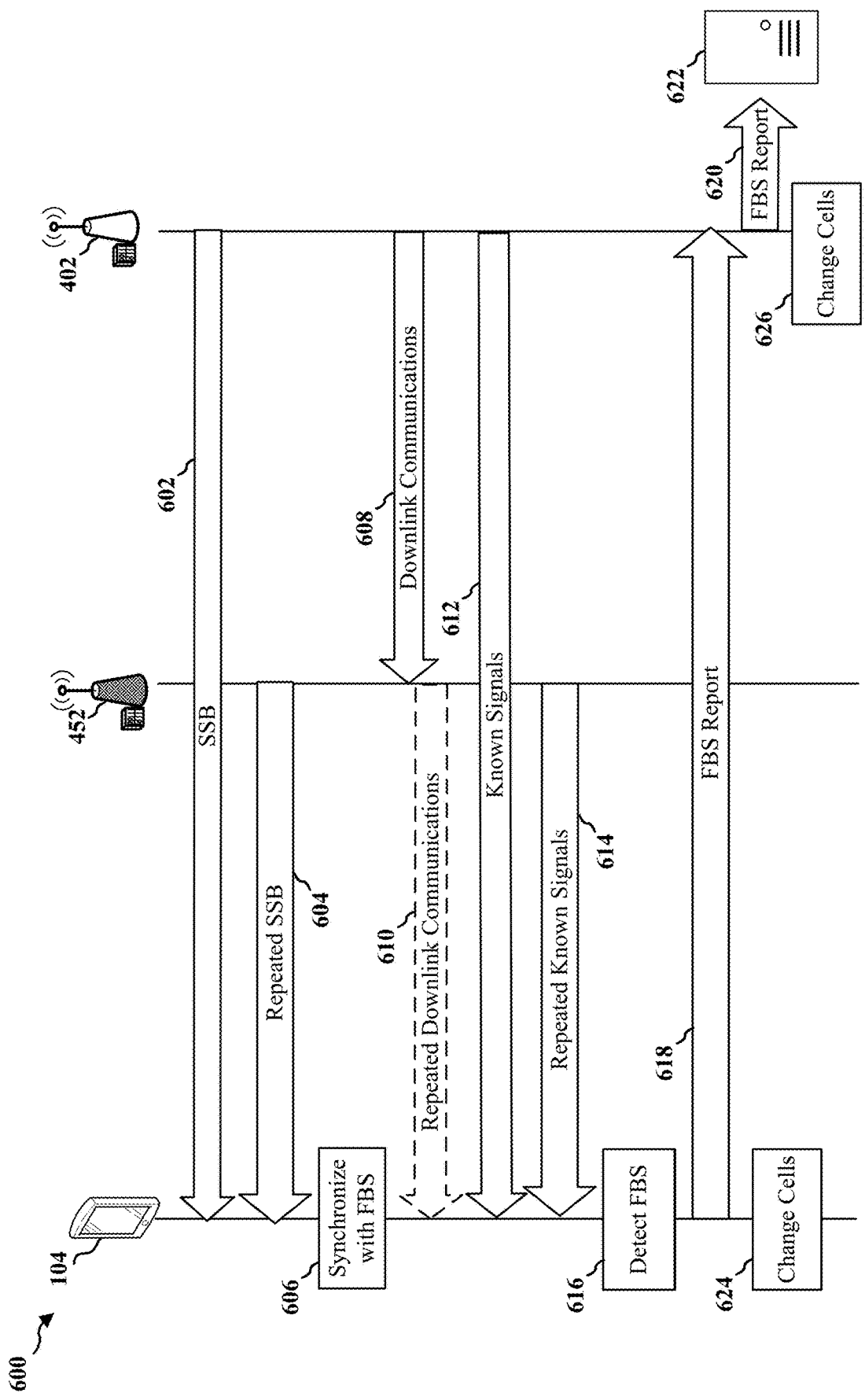
FIG. 6 is a message diagram illustrating example messages and processes for detecting an FBS.

FIG. 6 is a message diagram 600 illustrating messages for FBS detection and mitigation. As discussed with respect to FIG. 4, the FBS 452 may imitate the legitimate cell 402. For example, the legitimate cell 402 may broadcast an SSB 602. The SSB 602 may be received at both the FBS 452 and the UE 104. The FBS 452 may repeat the transmission of the SSB 602 as repeated SSB 604. The UE 104 may receive the repeated SSB 604 after receiving the SSB 602. The UE 104 may synchronize with one of the SSB 602 and the repeated SSB 604 based on the received signal strength. Accordingly, at block 606, the UE 104 may synchronize with the SSB 604 because the FBS 452 is generally received with a higher signal strength.

The legitimate cell 402 may transmit downlink communications 608 to the UE 104. The FBS 452 may repeat the downlink communications 608 as repeated downlink communications 610. The FBS 452 may selectively modify or drop the downlink communications 608. For example, for a denial of service attack, the FBS 452 may drop downlink communications 608 for a particular service and not transmit the repeated downlink communications 610 for that service. The UE 104 may be unaware when the FBS 452 drops downlink communications 608 because the UE 104 is not synchronized with the legitimate cell 402.

In an aspect, the legitimate cell 402 may configure the UE 104 with a threshold time period for detecting an FBS. The configuration may be carried by, for example, the SSB 602 or the downlink communications 608. In an implementation, the SSB 602 may include the PBCH carrying system information that includes the threshold. In another implementation, the configuration may be carried in UE specific communications (e.g., RRC) that are protected by PDCP ciphering and integrity protection.

The legitimate cell 402 may transmit signals 612 that are known to the UE 104, such as reference signals or synchronization signals. For example, the SSB and the CSI-RS may be known or determined based on the PCI of the legitimate cell 402. Generally, the FBS 452 will repeat the known signals 612 as repeated known signals 614 because the UE 104 may perform measurements based on the known signals and trigger a timeout event or change cells of the known signals 612 are not received. As the UE 104 receives both the known signals 612 and the repeated known signals 614, the UE 104 may analyze the channel power profile 500 of the known signals 612 and the repeated known signals 614. At block 616, the UE 104 may detect the FBS 452 based on a timing difference between the multipath components for the known signals 612 and the repeated known signals 614. The UE 104 may also consider whether the power level of the known signals 612 and the repeated known signals 614 has an inverted pattern when detecting the FBS 452.

In response to detecting the FBS 452, the UE 104 may perform a mitigation operation. For example, the UE 104 may transmit an FBS report 618 indicating the detected FBS. The FBS report 618 may be transmitted as a higher layer control message (e.g., RRC message) that is protected by PDCP ciphering and integrity protection. The legitimate cell 402 may forward the FBS report 618 as a report 620 to a security server 622. The security server 622 may provide information to network administrators or operators to take further action. Additionally, or alternatively, the UE 104 may change cells and/or the legitimate cell 402 may initiate a cell change. For example, at block 624, the UE 104 may autonomously select a different cell (e.g., by ignoring or disregarding the repeated SSB 604 from the FBS 452). Accordingly, the UE 104 may access the network via a different frequency, band, or system (e.g., LTE instead of 5G NR). At block 626, the legitimate cell 402 may facilitate a change of cells, for example, by initiating a handover of the UE 104 to a different cell. As another example, the legitimate cell 402 may update one or more communication parameters to de-prioritize the cells corresponding to the FBS 452 for cell selection/re-selection at the UE. In an aspect, the mitigation operations of the legitimate cell 402 may be applied to UEs that have not detected the FBS 452 (e.g., without an FBS detection component 140). Accordingly, the FBS mitigation component 198 may mitigate the effects of the FBS 452 for multiple UEs.

Figure 7:
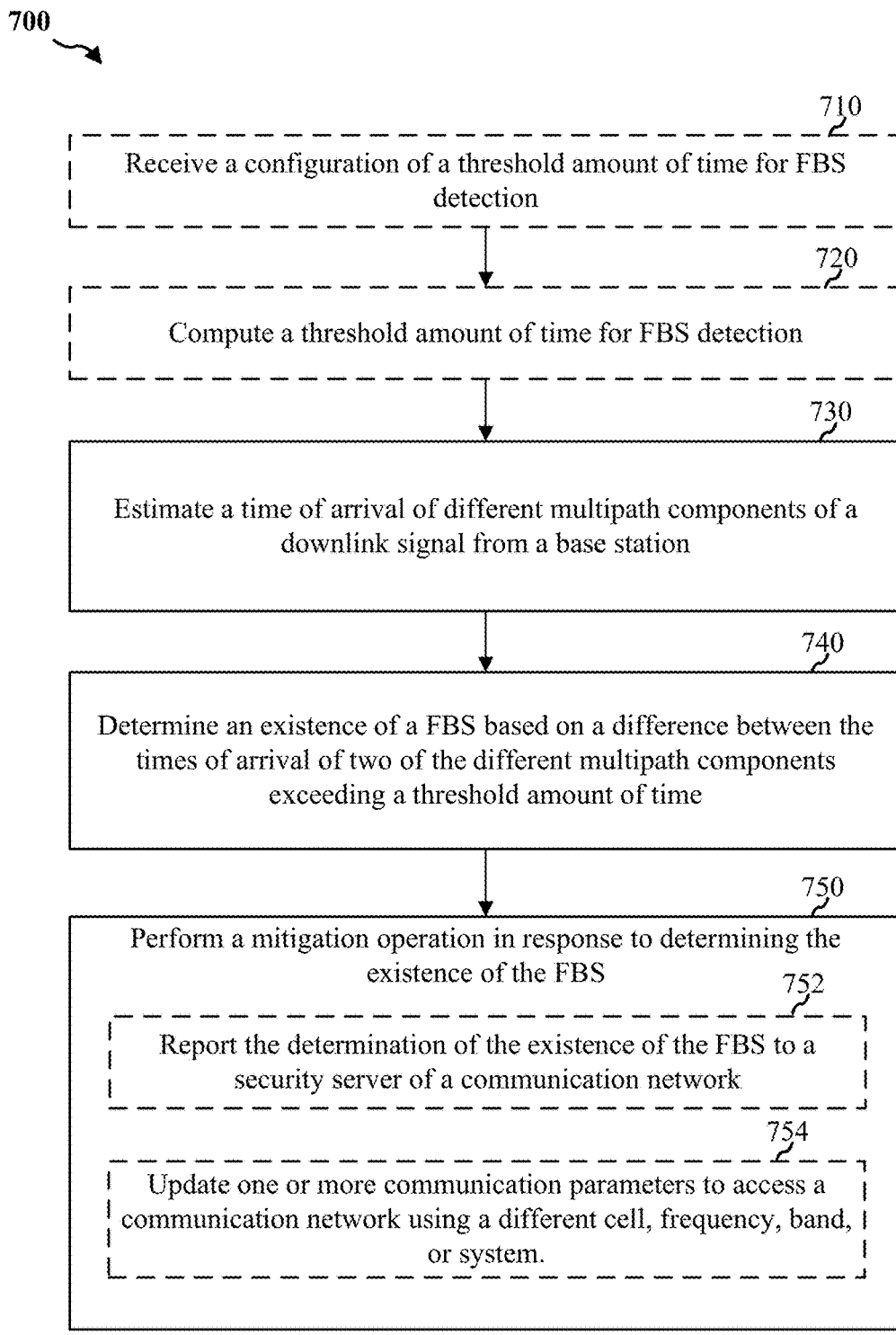
FIG. 7 is a flowchart of an example method of detecting an FBS at a UE.

FIG. 7 is a flowchart of a method 700 of wireless communication. The method 700 may be performed by a UE (e.g., the UE 104, the apparatus 802 or 902, which may include the memory 360 and which may be the entire UE 350 or a component of the UE 350 such as the TX processor 368, the RX processor 356, and/or the controller/processor 359). Optional aspects are illustrated with a dashed line. The method may enable a UE to detect the presence of an FBS.

At block 710, the UE may optionally receive a configuration of a threshold amount of time for FBS detection. For example, the indication component 806 of the apparatus 802 or 902 may receive the configuration of the threshold amount of time from the legitimate cell 402, 850 via the reception component 804. For instance, the indication component 806 may receive the threshold amount of time within system information of the legitimate cell 402, which may be repeated by the FBS 452. In another implementation, the indication component 806 may receive the threshold amount of time in UE specific signaling. For instance, the threshold amount of time may be configured in an RRC configuration message.

At block 720, the UE may optionally compute a threshold amount of time for FBS detection based on a maximum expected delay spread in a wireless channel. For example, the configuration component 808 of the apparatus 802 or 902 may compute the threshold amount of time for FBS detection. For example, the threshold amount of time may be a function of a numerology, sub-carrier spacing, or symbol period and the maximum expected delay spread, which may be based on a size of the cell. Accordingly, the configuration component 808 of the apparatus 802 or 902 may compute the threshold amount of time for FBS detection based on a current configuration.

At block 730, the UE estimates a time of arrival of different multipath components of a downlink signal from a base station. The UE may identify the base station that is a source of the downlink signal based on a PCI associated with the downlink signal. For example, the multipath component 812 of the apparatus 802 or 902 may estimate the time of arrival of different multipath components of a downlink signal from the base station. The time of arrival of a multipath component may be estimated by correlating the received downlink signal from a base station with a known reference signal. The correlation may be carried out at different points in time and the time of arrival of a multipath component may be estimated to be the time that results in the correlation value exceeding a threshold. The UE may receive a cluster 516 of multipath components having various times of arrival, e.g., as described in connection with FIG. 5. The UE may use the times of arrival for the cluster 516 of multipath components to estimate a time of arrival of different multipath components. For example, the UE may determine a window of time within which different multipath components are expected to arrive based on a downlink signal from a base station. The estimation may be further based on a length of the downlink signal, e.g., as described in connection with FIG. 5. For example, multipath components that have a time of arrival a threshold duration after the estimated time of arrival may be used to identify the presence of an FBS. For example, if the downlink signal has a duration of about one symbol, multipath components that arrive more than one symbol after the estimated time of arrival may be used to identify the presence of an FBS.

In some examples, the UE may estimate the time of arrival of the different multipath components for a particular base station, e.g., as identified by a PCI. For example, the PCI may be the PCI of a current serving cell to which the UE is connected. The downlink signal may be a known signal such as an SSB or CSI-RS. Accordingly, the multipath component 812 may receive the known signal via the reception component 804 and estimate the time of arrival of each multipath component. For instance, the multipath component 812 may generate the channel power profile 500 by identifying a power level (e.g., RSSI) for each of the arrival times. As described in connection with FIG. 5, a multipath component that is received at a later time and that has a higher power level may indicate the presence of an FBS, e.g., an FBS that is located closer to the UE than the base station, which leads to the higher power level, and that decodes the downlink signal before transmitting it to the UE, which leads to the later arrival time.

At block 740, the UE determines an existence of an FBS based on a difference between the times of arrival of two of the different multipath components exceeding a threshold amount of time. For example, the timing component 814 of the apparatus 802 or 902 may determine the existence of the FBS 452 based on the difference 540 between the times of arrival of two of the different multipath components (e.g., multipath components 510 and 520) exceeding the threshold amount of time (e.g., symbol duration 530). In an example in which the FBS is between the UE and the actual base station, the later arriving path (e.g., multipath component 520) of the different multipath components that is from the FBS may have a greater received signal strength than an earlier arriving path (e.g., multipath component 510) from the signal from the actual base station. The timing component 814 may determine the existence of the FBS based on the received signal strengths of the later arriving path and the earlier arriving path. For instance, the timing component 814 may confirm the FBS component when the later arriving multipath component 520 has a greater signal strength than the earlier arriving multipath component 510.

At block 750, the UE performs a mitigation operation in response to determining the existence of the FBS. For example, the mitigation component 816 of the apparatus 802 or 902 may perform the mitigation operation in response to determining the existence of the FBS 452. For example, at sub-block 752, the mitigation component 816 may report the determination of the existence of the FBS to a security server of a communication network. For instance, the mitigation component 816 may transmit the FBS report 618 to the security server 622 via the transmission component 810 and the legitimate cell 402. As another example, at sub-block 754, the mitigation component 816 may update one or more communication parameters to access a communication network using a different cell, frequency, band, or system. For instance, the mitigation component 816 may receive a handover command or configuration change command from the legitimate cell 402 in response to the FBS report 618. In another implementation, the mitigation component 816 may autonomously change communication parameters (e.g., measurements) to initiate a change of cell, frequency, band, or system. Accordingly, the UE 104 may mitigate the effects of the FBS 452, for example, by changing cells to avoid a denial of service attack.

Figure 8:
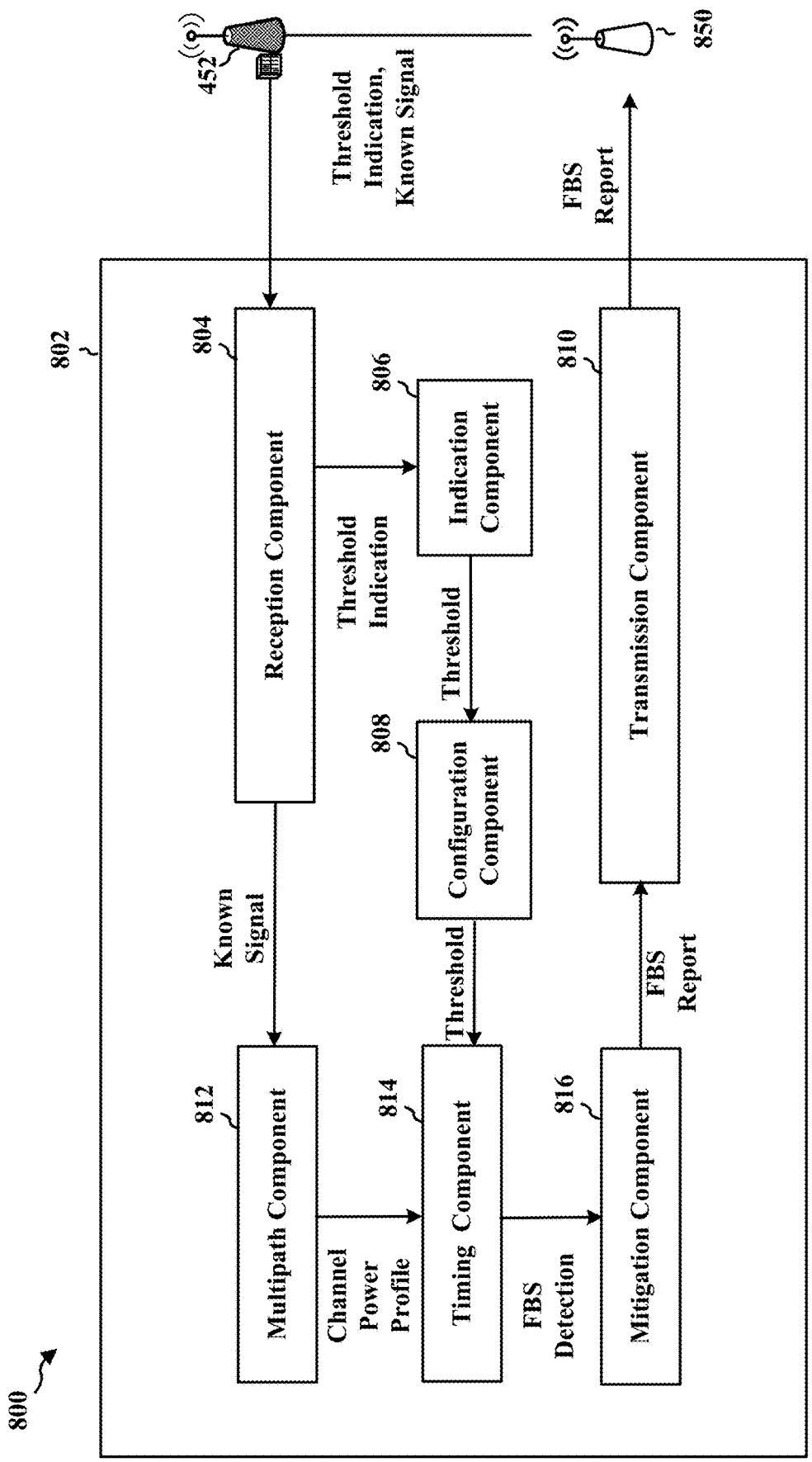
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a UE. The apparatus 802 includes a reception component 804 that receives downlink signals such a threshold indication or a known signal. The apparatus 802 includes an indication component 806 that receives the threshold indication from the reception component 804 and determines an FBS threshold e.g., as described in connection with block 710. The apparatus 802 includes a configuration component 808 that receives the FBS threshold from the indication component 806 or computes the FBS threshold e.g., as described in connection with block 720. The configuration component 808 may configure the timing component 814 with the FBS threshold. The apparatus 802 includes a multipath component 812 that receives the known signal from the reception component 804 and estimates the time of arrival of different multipath components of the known signal corresponding to a PCI, e.g., as described in connection with block 730. The apparatus 802 includes a timing component 814 that receives a channel power profile 500 generated by the multipath component 812 and determines the existence of an FBS based on the difference between the times of arrival of two of the different multipath components exceeding the FBS threshold, e.g., as described in connection with block 740. The apparatus 802 includes a mitigation component 816 that performs a mitigation operation, e.g., as described in connection with block 750. The apparatus 802 includes a transmission component 810 that transmits an uplink signal such as an FBS report.

The apparatus 802 may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
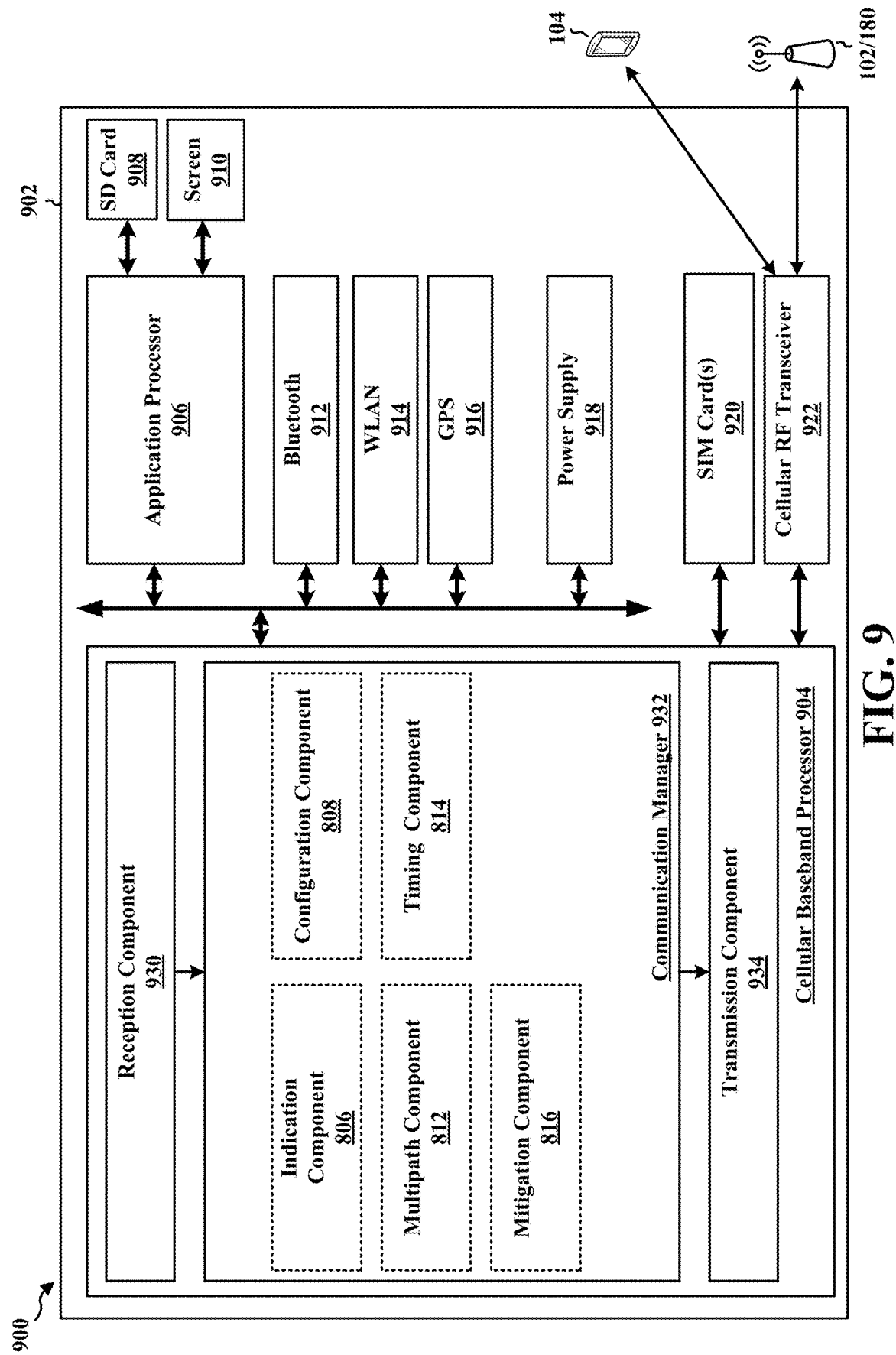
FIG. 9 is a diagram illustrating an example of a hardware implementation for an apparatus employing a processing system.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/ memory. The computer-readable medium/memory may be non-transitory. The cellular baseband processor 904 is responsible for general processing, including the execution of software stored on the computer-readable medium/ memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes the indication component 806, the configuration component 808, the multipath component 812, the timing component 814, and/or the mitigation component 816 that may be configured to perform the aspects described in connection with FIGS. 7 and 8.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for estimating a time of arrival of different multipath components of a downlink signal corresponding to a PCI; means for determining an existence of a FBS based on a difference between the times of arrival of two of the different multipath components exceeding a threshold amount of time; means for performing a mitigation operation in response to determining the existence of the FBS; and means for computing the threshold amount of time based on a maximum expected delay spread in a wireless channel. The aforementioned means may be one or more of the aforementioned components of the apparatus 902 configured to perform the functions recited by the aforementioned means. As described supra, the apparatus 902 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 10:
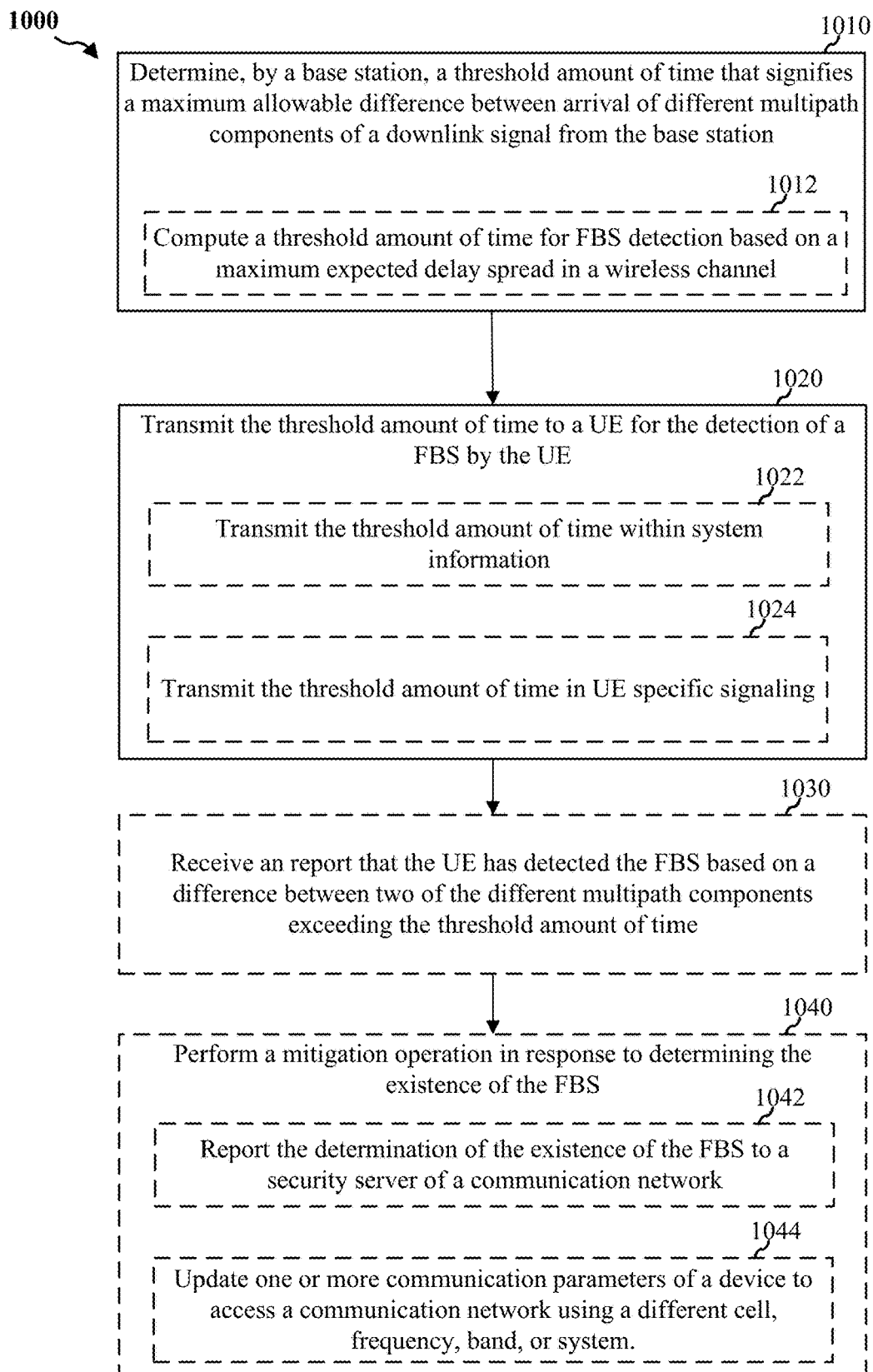
FIG. 10 is a flowchart of an example method of detecting an FBS at a base station.

FIG. 10 is a flowchart of a method 1000 of wireless communication. The method 1000 may be performed by a base station (e.g., the base station 102, the legitimate cell 402, the apparatus 1102, 1202 which may be the entire base station 310 or a component of the base station 310, such as the TX processor 316, the RX processor 370, and/or the controller/processor 375). Optional aspects are illustrated with a dashed line. The method may enable a base station to detect the presence of an FBS.

At block 1010, the base station determines a threshold amount of time that signifies a maximum allowable difference between arrival of different multipath components of a downlink signal from the base station. A source of the downlink signal may be indicated by a PCI associated with the downlink signal. For example, the computation component 1106 of the apparatus 1102 or 1202 may determine the threshold amount of time that signifies a maximum allowable difference between arrival of different multipath components of the downlink signal corresponding to the PCI of the base station. For example, in sub-block 1012, the block 1010 may optionally include computing a threshold amount of time for FBS detection based on a maximum expected delay spread in a wireless channel. In an aspect, for example, the computation component 1106 may compute the threshold amount of time for FBS detection based on the maximum expected delay spread in a wireless channel. For example, the threshold amount of time may be a function of a numerology, sub-carrier spacing, or symbol period and the maximum expected delay spread, which may be based on a size of the cell. Accordingly, the computation component 1106 may compute the threshold amount of time for FBS detection based on a current configuration.

At block 1020, the base station transmits the threshold amount of time to a UE for detection of an FBS by the UE. For example, the signaling component 1108 of the apparatus 1102 or 1202 may transmit the threshold amount of time to the UE 104 for detection of the FBS 452 by the UE 104. For instance, at sub-block 1022, the signaling component 1108 may transmit the threshold amount of time within system information. As another example, at sub-block 1024, the signaling component 1108 may transmit the threshold amount of time in UE specific signaling.

At block 1030, the base station may optionally receive a report that the UE has detected an FBS based on a difference between two of the different multipath components exceeding the threshold amount of time. For example, the FBS component 1112 of the apparatus 1102 or 1202 may receive the report (e.g., FBS report 618) that the UE 104 has detected the FBS based on the difference between two of the different multipath components exceeding the threshold amount of time.

At block 1040, the base station may optionally perform a mitigation operation in response to determining the existence of the FBS. For example, the mitigation component 1114 of the apparatus 1102 or 1202 may perform the mitigation operation in response to determining the existence of the FBS. For example, at block 1042, the mitigation component 1114 may report the determination of the existence of the FBS to the security server 622 of the communication network. As another example, at sub-block 1044, the mitigation component 1114 may update one or more communication parameters for a device to access a communication network using a different cell, frequency, band, or system. The device may be the device that detected the FBS and provided the indication. Accordingly, the mitigation component 1114 may change the parameters of the device to avoid the FBS. The device may additionally or alternatively be a different device that did not detect the FBS. The mitigation component 1114 may determine that the other device is also potentially vulnerable to the FBS and may change the parameters of the other device to protect the other device from the FBS.

Figure 11:
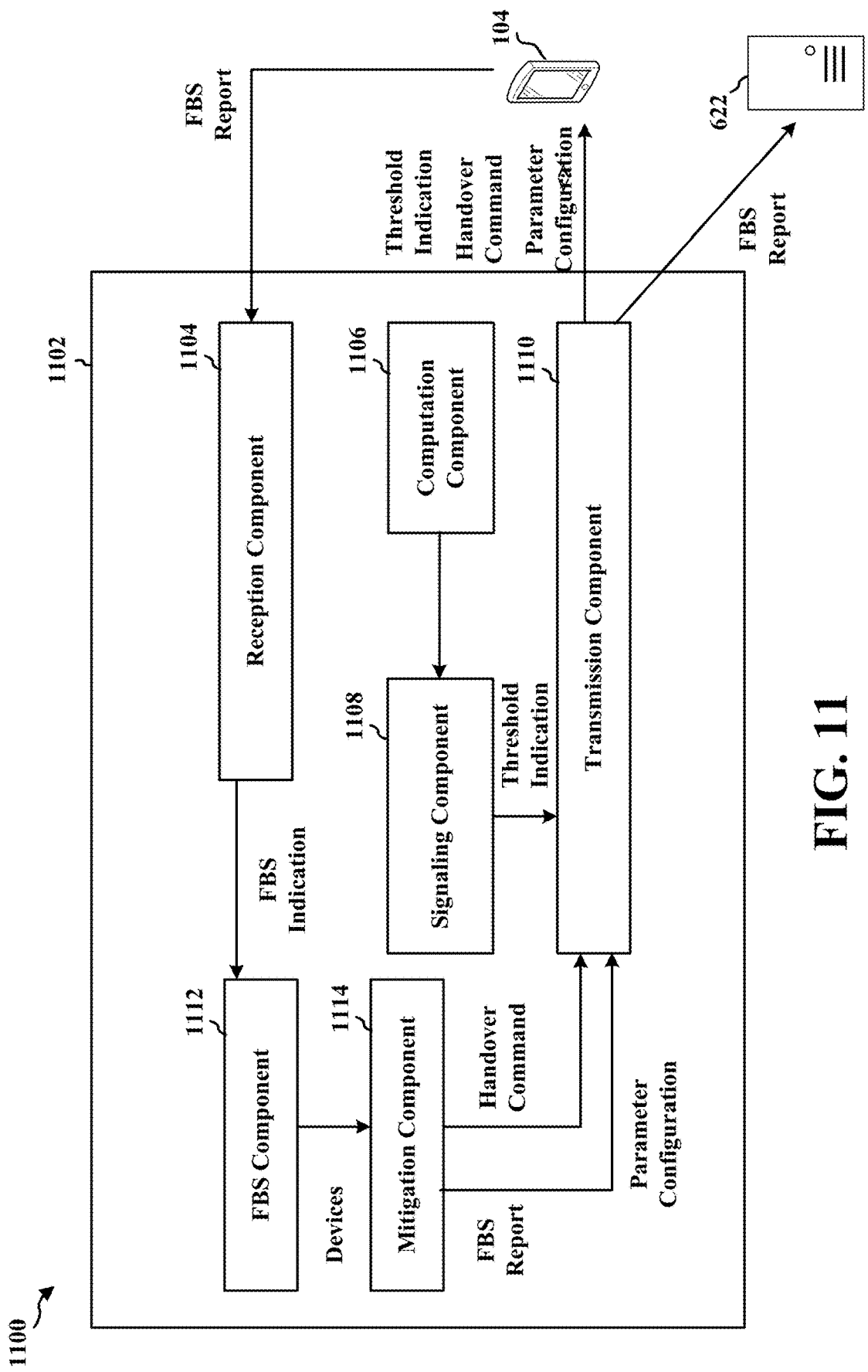
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus 1102 may be a base station. The apparatus 1102 includes a reception component 1104 that receives uplink signals such as an FBS report 618 and a transmission component 1110. The apparatus 1102 includes a computation component 1106 that computes a threshold amount of time that signifies the maximum allowable difference between arrival of different multipath components of a downlink signal corresponding to PCI of the base station based on a maximum expected delay spread in a wireless channel e.g., as described in connection with block 1010. The apparatus 1102 includes a signaling component 1108 that indicates the threshold amount of time, e.g., as described in connection with block 1020. The apparatus 1102 includes an FBS component 1112 that receives an indication that a device connected to the base station has detected a FBS, e.g., as described in connection with block 1030. The apparatus 1102 includes a mitigation component 1114 that performs a mitigation operation in response to the indication, e.g., as described in connection with block 1040.

The apparatus may include additional components that perform each of the blocks of the algorithm in the aforementioned flowcharts of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
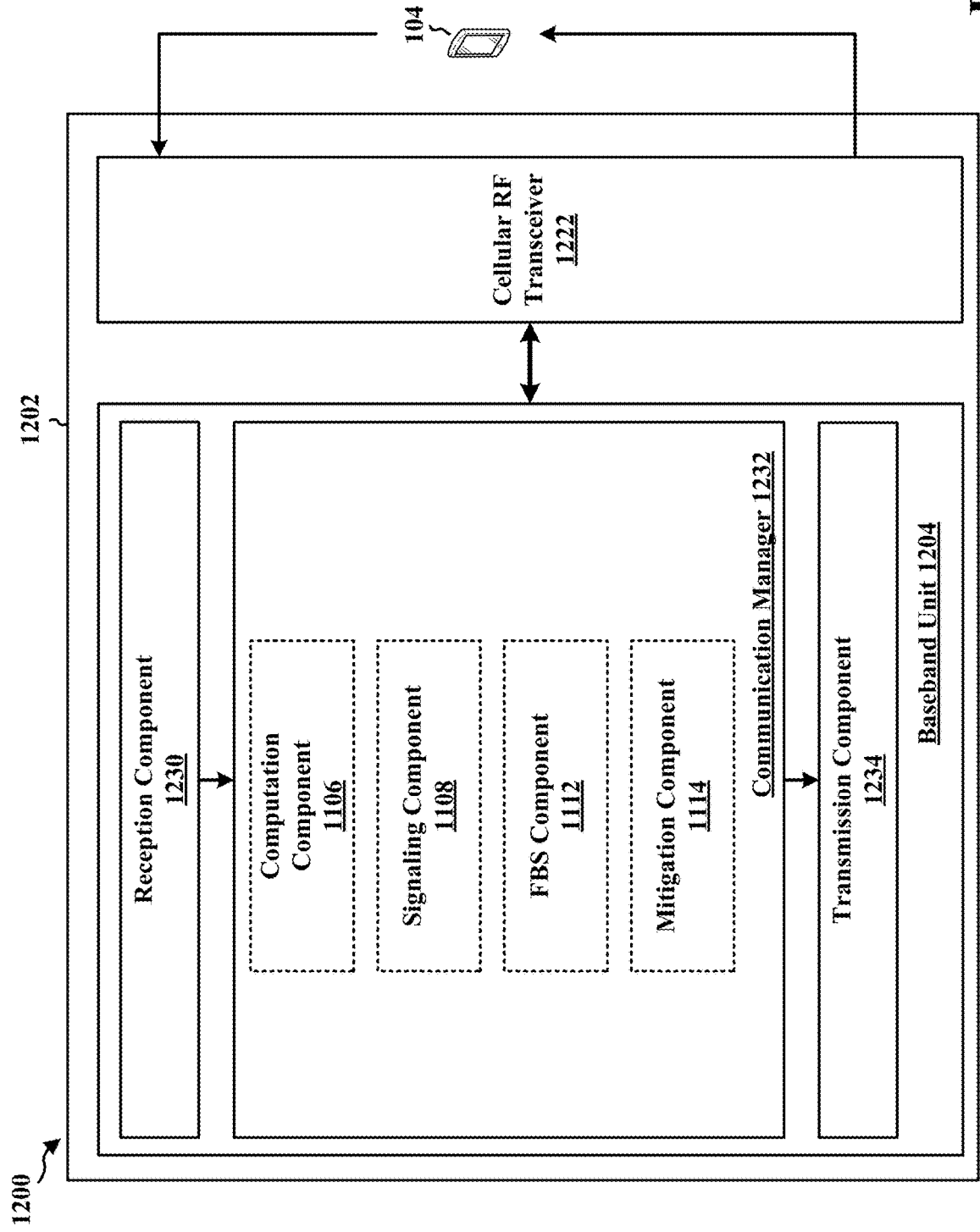
FIG. 12 is a diagram illustrating an example of a hardware implementation for an apparatus employing a processing system.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 may include the computation component 1106, the signaling component 1108, the FBS component 1112, and the mitigation component 1114 that are configured to perform the aspects described in connection with FIGS. 10 and 11.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for indicating, by a base station, a threshold amount of time that signifies a maximum allowable difference between arrival of different multipath components of a downlink signal corresponding to a PCI of the base station; means for receiving an indication that a device connected to the base station has detected a FBS based on a difference between two of the different multipath components exceeding the threshold amount of time; means for performing a mitigation operation in response to the indication; and means for computing the threshold amount of time based on a maximum expected delay spread in a wireless channel. The aforementioned means may be one or more of the aforementioned components of the apparatus 1202 configured to perform the functions recited by the aforementioned means. As described supra, the apparatus 1202 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

In view of the foregoing, the present disclosure provides for detection and mitigation of an FBS. That is, by detecting an FBS, a UE may avoid synchronizing with the FBS and the FBS may not be able to launch an attack such as a man-in-the-middle denial of service attack against the UE. Accordingly, the present disclosure improves the performance and security of a UE. Further, by reporting the FBS to a legitimate base station and/or security server, the UE allows the network to mitigate the effects of the FBS. For example, the network may change parameters of another UE such that the other UE also avoids the FBS.

The following aspects are illustrative only and may be combined with other aspects or teaching described herein, without limitation.

Aspect 1 is a method of wireless communication for a UE, comprising: estimating a time of arrival of different multipath components of a downlink signal from a base station; determining an existence of a FBS based on a difference between times of arrival of two of the different multipath components exceeding a threshold amount of time; and performing a mitigation operation in response to determining the existence of the FBS.

In aspect 2, the method of aspect 1 further includes that the UE identifies the base station that is a source of the downlink signal based on a PCI associated with the downlink signal.

In aspect 3, the method of aspect 1 or aspect 2 further includes that the downlink signal is an SSB.

In aspect 4, the method of aspect 1 or aspect 2 further includes that the downlink signal is a CSI-RS.

In aspect 5, the method of any of aspects 1-4 further includes that the threshold amount of time is received within system information.

In aspect 6, the method of any of aspects 1-4 further includes that the threshold amount of time is received in UE specific signaling.

In aspect 7, the method of any of aspects 1-6 further includes computing the threshold amount of time based on a maximum expected delay spread in a wireless channel.

In aspect 8, the method of any of aspects 1-7 further includes that performing the mitigation operation comprises reporting the determination of the existence of the FBS to a security server of a communication network.

In aspect 9, the method of any of aspects 1-8 further includes that performing the mitigation operation comprises updating one or more communication parameters to access a communication network using a different cell, frequency, band, or system.

In aspect 10, the method of any of aspects 1-9 further includes that a later arriving path of the different multipath components has a greater received signal strength than an earlier arriving path of the different multipath components.

In aspect 11, the method of aspect 10 further includes that determining the existence of the FBS is further based on the received signal strengths of the later arriving path and the earlier arriving path.

Aspect 12 is a device including one or more processors and one or more memories in electronic communication with the one or more processors storing instructions executable by the one or more processors to cause the device to implement a method as in any of aspects 1-11.

Aspect 13 is a system or apparatus including means for implementing a method or realizing an apparatus as in any of aspects 1-11.

Aspect 14 is a non-transitory computer readable medium storing instructions executable by one or more processors to cause the one or more processors to implement a method as in any of aspects 1-11.

Aspect 15 is a method of wireless communication, comprising: determining, by a base station, a threshold amount of time that signifies a maximum allowable difference between arrival of different multipath components of a downlink signal from the base station; and transmitting the threshold amount of time to a UE for detection of a FBS by the UE.

In aspect 16, the method of aspect 15 further includes that a source of the downlink signal is indicated by a PCI associated with the downlink signal.

In aspect 17, the method of aspect 15 or aspect 16 further includes receiving a report that the UE has detected the FBS based on a difference between two of the different multipath components exceeding the threshold amount of time; and performing a mitigation operation in response to the indication.

In aspect 18, the method of aspect 17 further includes that performing the mitigation operation comprises updating one or more communication parameters of the UE to access a communication network using a different cell, frequency, band, or system.

In aspect 19, the method of aspect 17 or 18 further includes that performing the mitigation operation comprises updating one or more communication parameters of another device connected to the base station to access a communication network using a different cell, frequency, band, or system.

In aspect 20, the method of any of aspects 15-19 further includes that transmitting the threshold amount of time comprises transmitting the threshold amount of time within system information.

In aspect 21, the method of any of aspects 15-19 further includes that transmitting the threshold amount of time comprises transmitting the threshold amount of time in UE specific signaling.

In aspect 22, the method of any of aspects 15-21 further includes that determining the threshold amount of time comprises computing the threshold amount of time based on a maximum expected delay spread in a wireless channel.

Aspect 23 is a device including one or more processors and one or more memories in electronic communication with the one or more processors storing instructions executable by the one or more processors to cause the device to implement a method as in any of aspects 15-22.

Aspect 24 is a system or apparatus including means for implementing a method or realizing an apparatus as in any of aspects 15-22.

Aspect 25 is a non-transitory computer readable medium storing instructions executable by one or more processors to cause the one or more processors to implement a method as in any of aspects 15-22.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a base station, comprising:
    a memory; and
    at least one processor coupled to the memory and configured to:
        determine a threshold amount of time that signifies a maximum allowable difference between arrival of different multipath components of a downlink signal from the base station; and
        transmit the threshold amount of time to a user equipment (UE) for detection of a false base station (FBS) by the UE.

2. The apparatus of claim 1, wherein a source of the downlink signal is indicated by a physical cell identity (PCI) associated with the downlink signal.

3. The apparatus of claim 1, wherein the downlink signal is a synchronization signal block (SSB).

4. The apparatus of claim 1, wherein the downlink signal is a channel state information reference signal (CSI-RS).

5. The apparatus of claim 1, wherein the at least one processor is configured to:
    receive a report that the UE has detected the FBS based on a difference between two of the different multipath components exceeding the threshold amount of time; and
    perform a mitigation operation in response to the report.

6. The apparatus of claim 5, wherein to perform the mitigation operation, the at least one processor is configured to update one or more communication parameters of the UE to access a communication network using a different cell, frequency, band, or system.

7. The apparatus of claim 5, wherein to perform the mitigation operation, the at least one processor is configured to update one or more communication parameters of another device connected to the base station to access a communication network using a different cell, frequency, band, or system.

8. The apparatus of claim 1, wherein to transmit the threshold amount of time, the at least one processor is configured to transmit the threshold amount of time within system information.

9. The apparatus of claim 1, wherein to transmit the threshold amount of time, the at least one processor is configured to transmit the threshold amount of time in UE specific signaling.

10. The apparatus of claim 1, wherein to determine the threshold amount of time, the at least one processor is configured to compute the threshold amount of time based on a maximum expected delay spread in a wireless channel.

11. The apparatus of claim 1, further comprising at least one transceiver coupled the at least one processor.

12. A method of wireless communication at a base station, comprising:
    determining a threshold amount of time that signifies a maximum allowable difference between arrival of different multipath components of a downlink signal from the base station; and
    transmitting the threshold amount of time to a user equipment (UE) for detection of a false base station (FBS) by the UE.

13. The method of claim 12, wherein a source of the downlink signal is indicated by a physical cell identity (PCI) associated with the downlink signal.

14. The method of claim 12, wherein the downlink signal is a synchronization signal block (SSB).

15. The method of claim 12, wherein the downlink signal is a channel state information reference signal (CSI-RS).

16. The method of claim 12, further comprising:
    receiving a report that the UE has detected the FBS based on a difference between two of the different multipath components exceeding the threshold amount of time; and
    performing a mitigation operation in response to the report.

17. The method of claim 16, wherein performing the mitigation operation comprises updating one or more communication parameters of the UE to access a communication network using a different cell, frequency, band, or system.

18. The method of claim 12, wherein transmitting the threshold amount of time comprises transmitting the threshold amount of time within system information.

19. The method of claim 12, wherein transmitting the threshold amount of time comprises transmitting the threshold amount of time in UE specific signaling.

20. The method of claim 12, wherein determining the threshold amount of time comprises computing the threshold amount of time based on a maximum expected delay spread in a wireless channel.

* * * * *